(12) United States Patent
Migishima

(10) Patent No.: US 12,166,943 B2
(45) Date of Patent: Dec. 10, 2024

(54) IMAGE PROCESSING APPARATUS, IMAGE PROCESSING METHOD, AND STORAGE MEDIUM FOR INSERTING IMAGE DATA IN A FILE

(71) Applicant: CANON KABUSHIKI KAISHA, Tokyo (JP)

(72) Inventor: Isao Migishima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/184,508

(22) Filed: Mar. 15, 2023

(65) Prior Publication Data

US 2023/0308589 A1 Sep. 28, 2023

(30) Foreign Application Priority Data

Mar. 22, 2022 (JP) ................................ 2022-045085

(51) Int. Cl.
  *H04N 1/00* (2006.01)
  *H04N 1/04* (2006.01)
  *H04N 1/387* (2006.01)

(52) U.S. Cl.
  CPC ....... *H04N 1/3871* (2013.01); *H04N 1/00244* (2013.01); *H04N 1/00411* (2013.01); *H04N 1/0044* (2013.01); *H04N 1/04* (2013.01); *H04N 1/3872* (2013.01)

(58) Field of Classification Search
  CPC ............. H04N 1/387; H04N 1/00; H04N 1/04
  See application file for complete search history.

(56) References Cited

U.S. PATENT DOCUMENTS

| 2007/0253020 | A1* | 11/2007 | Hull ..................... | H04N 1/0044 |
| | | | | 358/1.15 |
| 2012/0079375 | A1* | 3/2012 | Ogino ................ | H04N 1/00448 |
| | | | | 715/274 |
| 2018/0307449 | A1* | 10/2018 | Tsuji ....................... | H04N 1/387 |
| 2022/0070310 | A1* | 3/2022 | Tomioka .................. | H04N 1/04 |
| 2023/0007347 | A1* | 1/2023 | Deora .................... | G11B 27/34 |

FOREIGN PATENT DOCUMENTS

JP 2012093847 A 5/2012

OTHER PUBLICATIONS

English Machine Translation of JP 2012-093847-A (Takahisa et al., Published May 17, 2012) (Year: 2012).*

* cited by examiner

Primary Examiner — Juan M Guillermety
(74) Attorney, Agent, or Firm — Canon U.S.A., Inc. IP Division

(57) ABSTRACT

An image processing apparatus includes a generation unit configured to generate image data by scanning a document, a reception unit configured to receive a selection of a file including page data, the file being stored, and an addition unit configured to perform processing for adding the image data generated by the generation unit to the page data included in the selected file.

8 Claims, 14 Drawing Sheets

FIG.8
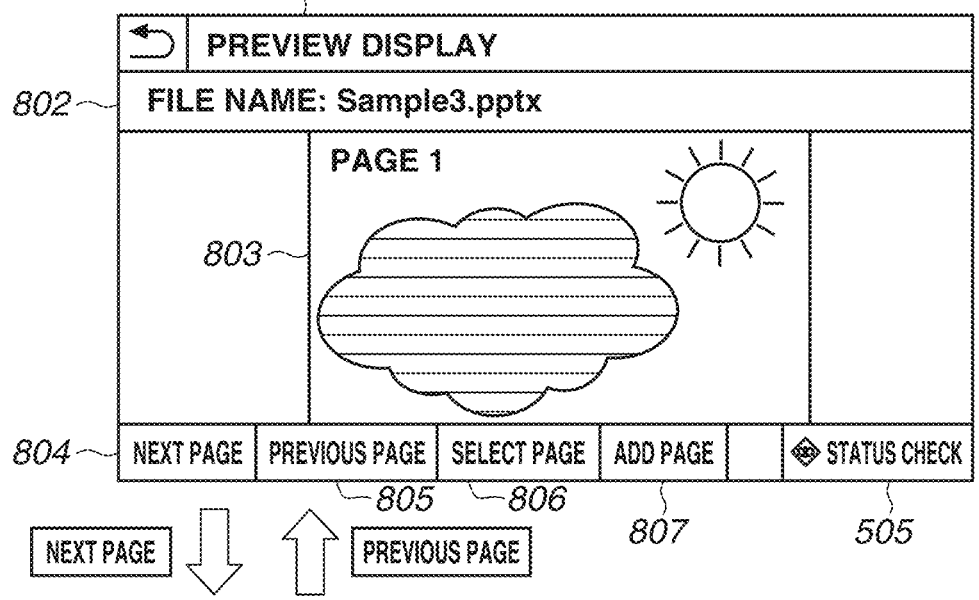
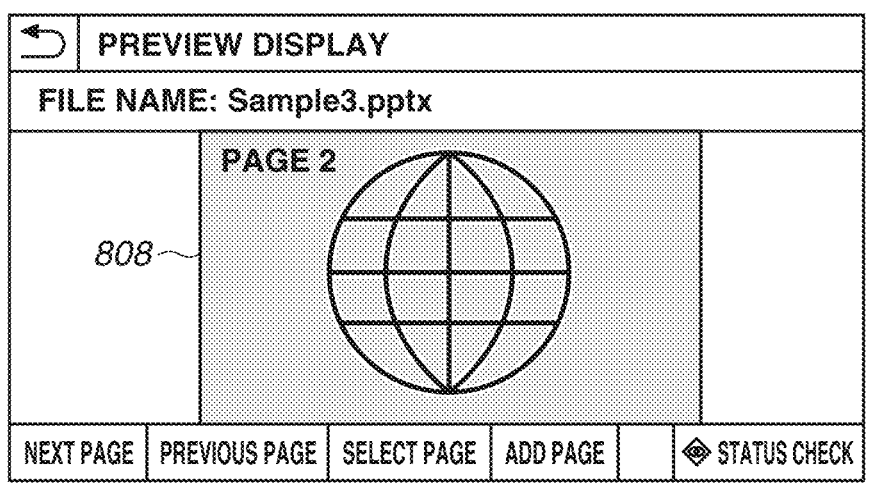
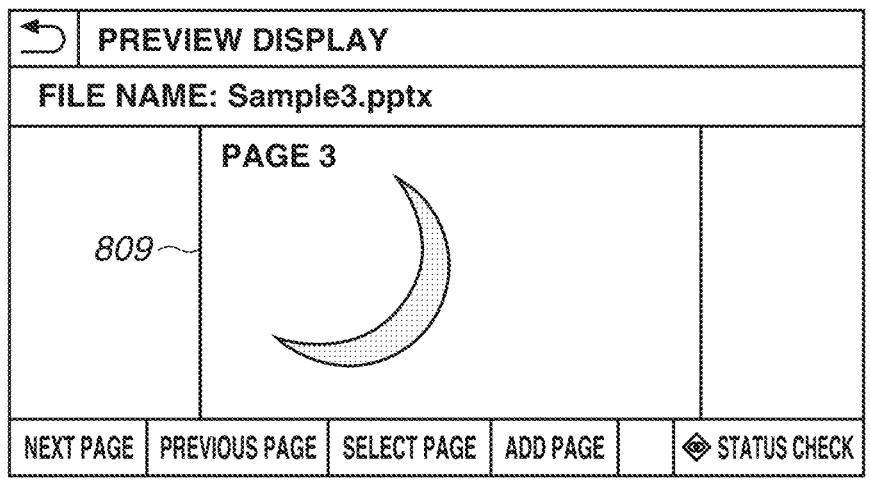

FIG.9

| | | | |
|---|---|---|---|
| ↩ | SCAN TO OFFICE | | |
| 802 | FILE NAME: Sample3.pptx | ✎ | RESET |
| 902 | READ SETTINGS | ◇ | START MONOCHROME SCAN |
| 903 | READ SIZE: A4 | | |
| 904 | RESOLUTION: 300 dpi | ◇ | START COLOR SCAN |
| 905 | READ MODE: GRAPHICS | | |
| 906 | CONTOUR ENHANCEMENT: OFF | | |
| 907 | WHITE BACKGROUND REMOVAL: OFF | 👁 | STATUS CHECK |

FIG.10
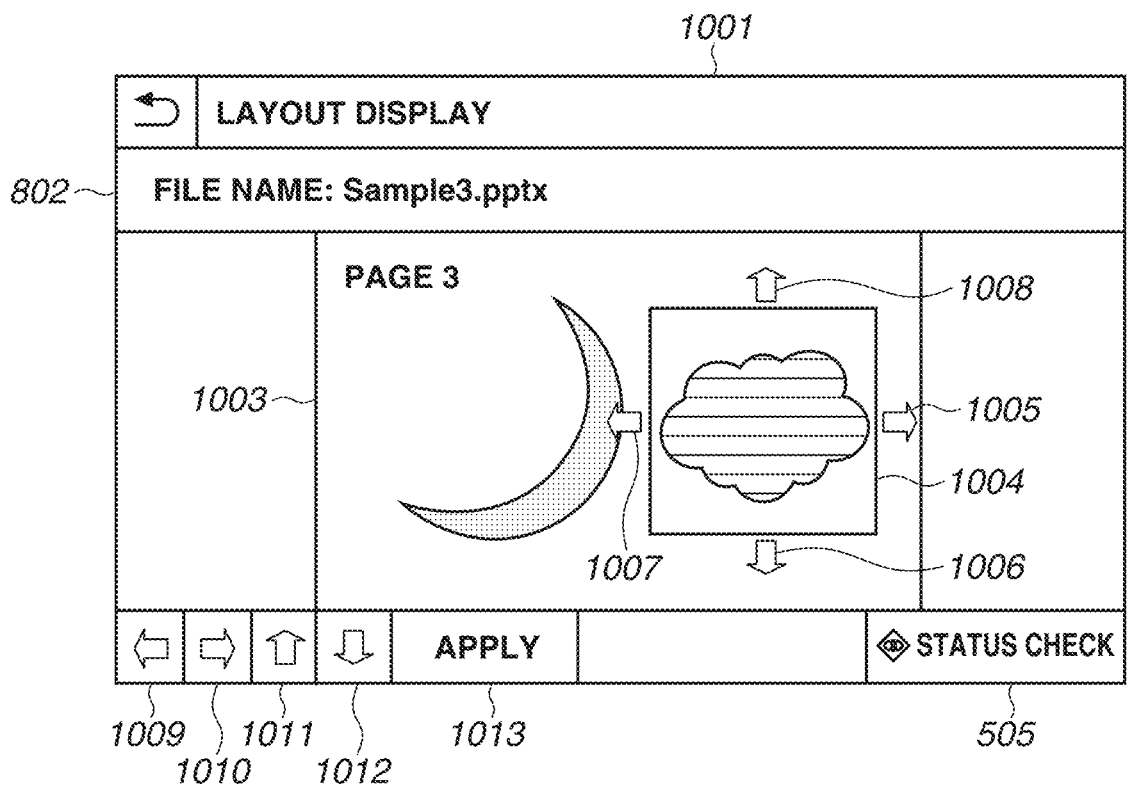
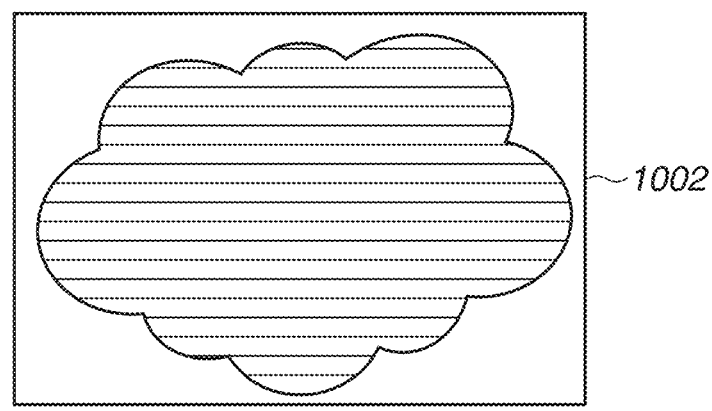

IMAGE PROCESSING APPARATUS, IMAGE PROCESSING METHOD, AND STORAGE MEDIUM FOR INSERTING IMAGE DATA IN A FILE

BACKGROUND

Field of the Disclosure

The present disclosure relates to an image processing apparatus, an image processing method, and a storage medium.

Description of the Related Art

Japanese Patent Application Laid-Open No. 2012-93847 discloses a technique for attaching image data generated by scanning a document image via an image processing apparatus, to a generated file such as an Excel file.

The technique disclosed in Japanese Patent Application Laid-Open No. 2012-93847 cannot attach image data generated by scanning a document, to an existing file. Therefore, to attach generated image data to an existing file, a user needs to perform troublesome operations including opening the file by using a personal computer (PC) and attaching the generated image data to the file.

SUMMARY

Embodiments of the present disclosure are directed to reducing the user's trouble in attaching image data generated by scanning a document image via an image processing apparatus, to an existing file.

According to embodiments of the present disclosure, an image processing apparatus includes a generation unit configured to generate image data by scanning a document, a reception unit configured to receive a selection of a file including page data, the file being stored, and an addition unit configured to perform processing for adding the image data generated by the generation unit to the page data included in the selected file.

Further features of the present disclosure will become apparent from the following description of exemplary embodiments with reference to the attached drawings.

BRIEF DESCRIPTION OF THE DRAWINGS

FIG. 8 illustrates a state where the operation unit displays a preview of the file selected in the file list in FIG. 7.

FIG. 9 illustrates an example of a scan setting screen displayed on the operation unit of the MFP.

FIG. 10 illustrates a state where the operation unit displays a preview as a composite image of a page specified in the preview in FIG. 8 and a scanned image.

DESCRIPTION OF THE EMBODIMENTS

Exemplary embodiments of the present disclosure will be described below with reference to the accompanying drawings. Configurations described in the following exemplary embodiments are to be considered as illustrative, and the present disclosure is not limited to illustrated configurations.

Figure 1:
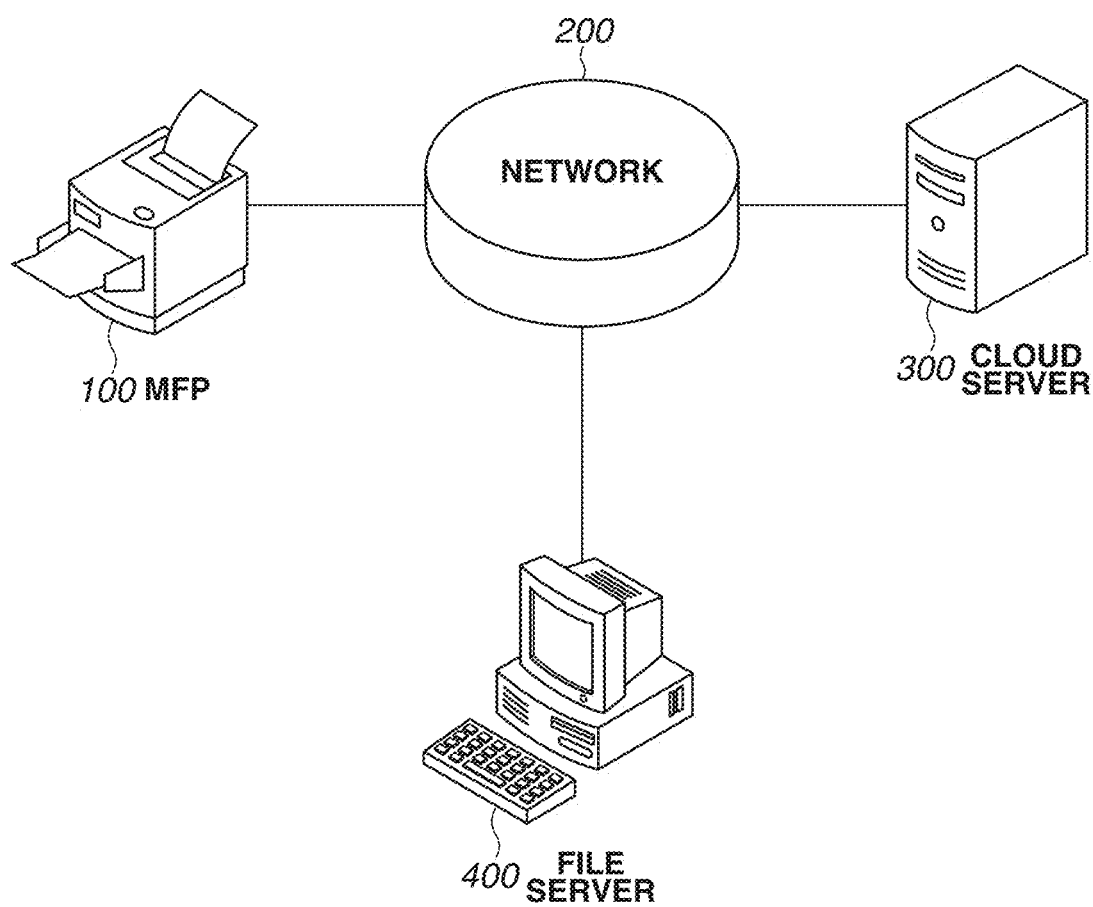
FIG. 1 illustrates an example of a system configuration of the present disclosure.

A first exemplary embodiment will be described below. FIG. 1 illustrates an example of a system configuration of the present disclosure.

The system configuration of the first exemplary embodiment is an example of a cloud storage service, and includes a cloud server 300 and a multifunction peripheral (MFP) 100 as an image processing apparatus capable of communicating with the cloud server 300 via a network 200. A file server 400 is also connected to this system via the network 200 and is capable of performing communication. The cloud server 300 stores image files uploaded from the MFP 100 and manages the display and editing of image files in response to accesses from a mobile terminal and a personal computer (PC) (not illustrated) through user operations. The file server 400 receives an image file transmitted from the MFP 100 and manages the display and editing of image files in response to accesses from a mobile terminal and a PC (not illustrated) through user operations. The network 200 according to the present exemplary embodiment may be the Internet or a local area network (LAN) and may be a wired or wireless network.

Figure 2:
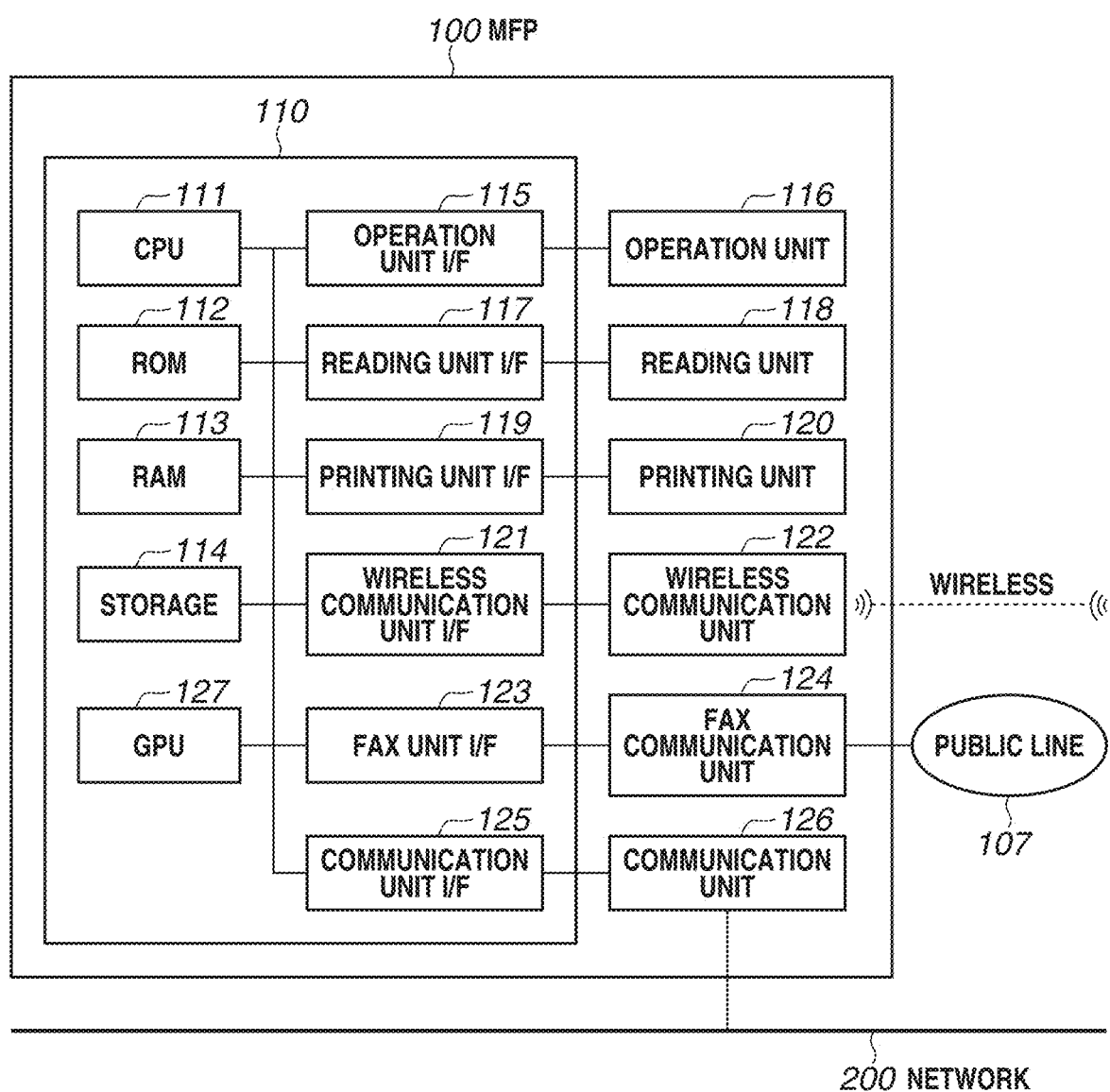
FIG. 2 illustrates an example of a hardware configuration of a multifunction peripheral (MFP).

FIG. 2 illustrates an example of a hardware configuration of the MFP 100. The MFP 100 includes a central processing unit (CPU) 111, a read only memory (ROM) 112, a random access memory (RAM) 113, a storage 114, an operation unit I/F 115, an operation unit 116, a reading unit I/F 117, a reading unit 118, a printing unit I/F 119, a printing unit 120, a wireless communication unit I/F 121, and a wireless communication unit 122. The MFP 100 also includes a FAX unit I/F 123, a FAX communication unit 124, a communication unit I/F 125, and a communication unit 126. A control unit 110 including the CPU 111 controls the overall operation of the MFP 100. The CPU 111 loads a control program stored in the ROM 112 or the storage 114 into the RAM 113 and performs reading control, printing control, and other various types of control. The ROM 112 stores control programs that can be executed by the CPU 111. The ROM 112 also stores a boot program and font data. The RAM 113 is the main memory and is used as a temporary storage area for loading various control programs stored in the ROM 112 and the storage 114. The storage 114 stores image data, print data, various programs, and various setting information. Although the present exemplary embodiment assumes a flash memory as the storage 114, auxiliary memories such as a solid state drive (SSD) and a hard disk drive (HDD) may also be usable. An embedded Multi Media Card (eMMC) may also be usable. In the MFP 100 according to the present exemplary embodiment, one CPU (CPU 111) executes the processing illustrated in flowcharts (described below) by using one memory (RAM 113). However, the present disclosure is not limited thereto. For example, pluralities of CPUs, RAMs, ROMs and storages can be collaboratively operated to perform processing in flowcharts (described below). Processing may be partly executed by using hardware circuitry such as an application specific integrated circuit (ASIC) and a Field Programmable Gate Array (FPGA). The operation unit I/F 115 connects between the control unit 110 and the operation unit 116 including a display unit, such as a touch panel, and hardware keys. The operation unit 116 displays information to the user and detects an input from the user. The reading unit I/F 117 connects between the control unit 110 and the reading unit 118, such as a scanner. When the reading unit 118 reads a document image, the CPU 111 converts the image into image data such as binary data. The image data generated based on the image read by the reading unit 118 is transmitted to an external apparatus or printed on recording paper. The reading unit 118 is provided with an automatic document feeder (ADF) that feeds the documents placed on the document tray of the MFP 100 and reads the image of the fed document to generate image data. The printing unit I/F 119 connects between the control unit 110 and the printing unit 120, such as a printer. The CPU 111 transfers image data (print data) stored in the RAM 113 to the printing unit 120 via the printing unit I/F 119. The printing unit 120 prints an image based on the transferred image data on recording paper fed from a feed cassette. The wireless communication unit I/F 121, an interface for controlling the wireless communication unit 122, wirelessly connects between the control unit 110 and an external wireless device. The control unit 110 controls the FAX communication unit 124 such as a facsimile via the FAX unit I/F 123 to connect to a public network 107. The FAX unit I/F 123, an interface for controlling the FAX communication unit 124, controls a modem and a network control unit (NCU) for facsimile communication to enable connecting to the public network 107 and controlling a facsimile communication protocol. The communication unit I/F 125 connects between the control unit 110 and the network 200. The communication unit I/F 125 enables the communication unit 126 to transmit image data and various information in the apparatus to an external apparatus on the network 200, and receive print data and information on the network 200 from an information processing apparatus on the network 200. As a method for transmitting and receiving information via the network 200, the CPU 111 can transmit and receive data by E-mail and perform file transmission based on other protocols, such as file transfer protocol (FTP), Server Message Block (SMB), and Web-based Distributed Authoring and Versioning (WebDAV).

Figure 3:
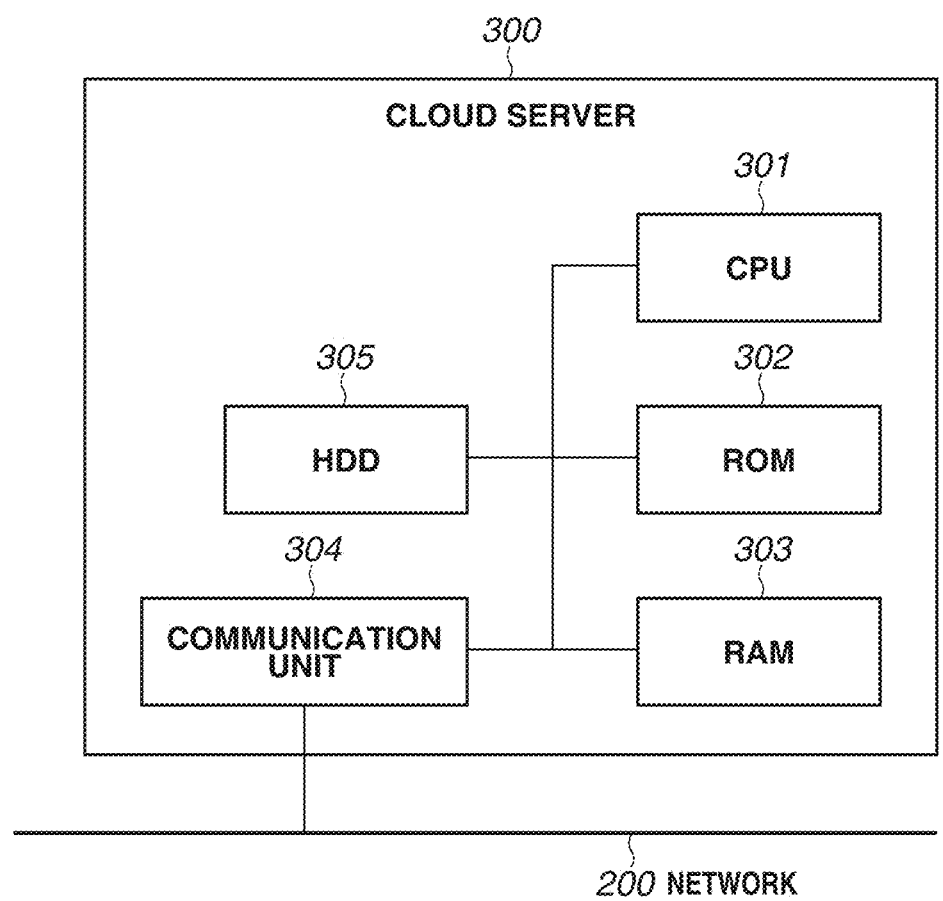
FIG. 3 illustrates an example of a hardware configuration of a cloud server.

FIG. 3 illustrates an example of a hardware configuration of the cloud server 300. A CPU 301 reads a control program stored in a ROM 302 and performs various processing for controlling the operation of the cloud server 300. The ROM 302 stores control programs. A RAM 303 is used as the main memory for the CPU 301 and a temporary storage area such as a work area. An HDD 305 stores various data such as image data. The cloud server 300 can transmit and receive data to/from various apparatuses such as the MFP 100 via a communication unit 304. The communication unit 304 may perform wired communication using Ethernet (registered trademark) and wireless communication such as Wi-Fi.

Figure 4:
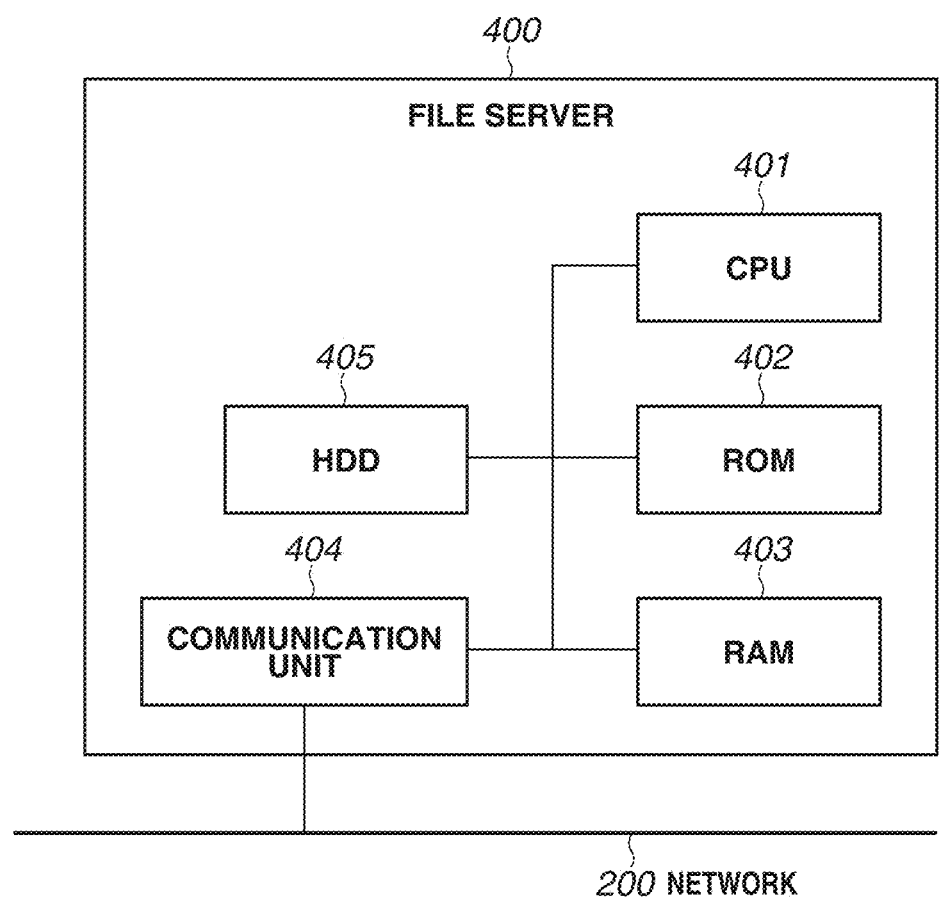
FIG. 4 illustrates an example of a hardware configuration of a file server.

FIG. 4 illustrates an example of a hardware configuration of the file server 400. A CPU 401 reads a control program stored in a ROM 402 and performs various processing for controlling the operation of the file server 400. The ROM 402 stores control programs.

A RAM 403 is used as the main memory for the CPU 401 and a temporary storage area such as a work area. An HDD 405 stores various data such as image data. The file server 400 can transmit and receive data to/from various apparatuses such as the MFP 100 via a communication unit 404.

Figure 5:
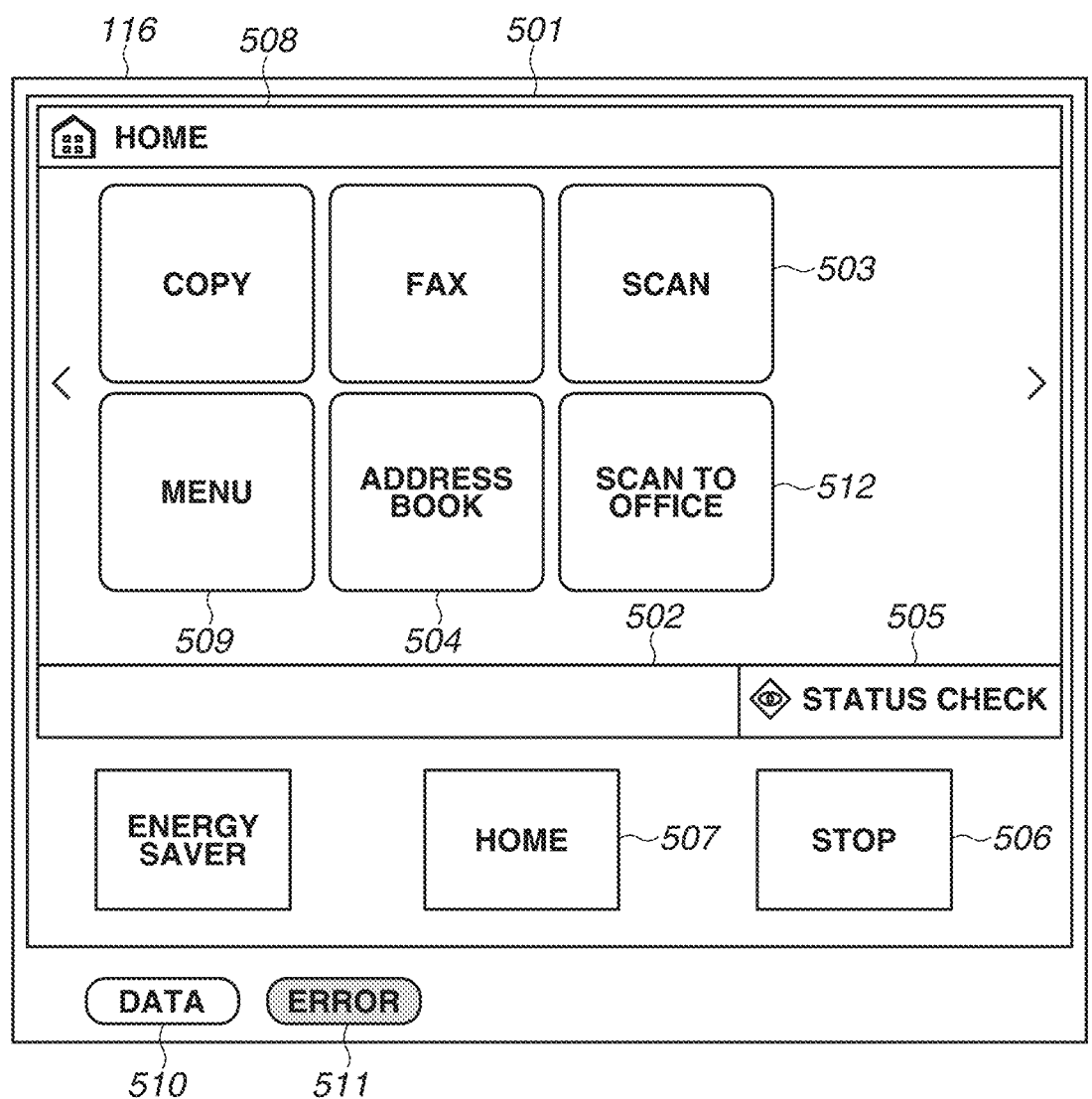
FIG. 5 illustrates an example of a Home screen displayed on an operation unit of the MFP.

FIG. 5 illustrates an example of a Home screen displayed on the operation unit 116 of the MFP 100.

The operation unit 116 includes a touch panel 501 for displaying an operation screen and light emitting diodes (LEDs) 510 and 511. The touch panel 501 also functions as a reception unit for receiving user instructions and as a display unit for displaying a screen. The user directly touches the screen displayed on the touch panel 501 with an object such as a finger or stylus to instruct the MFP 100 to perform each function based on the displayed screen.

The touch panel 501 illustrated in FIG. 5 displays a Home screen 508. The Home screen 508 is the initial screen for instructing the MFP 100 to perform each function of the MFP 100. The Home screen 508 is used to select a screen for setting various setting values for each of functions performed by the MFP 100, such as copy, fax, and scan. A Status Check button 505 is an object for displaying a screen for checking the status (status check screen) of the MFP 100. The status check screen (not illustrated) enables displaying a transmission history and a job execution history.

Figure 6:
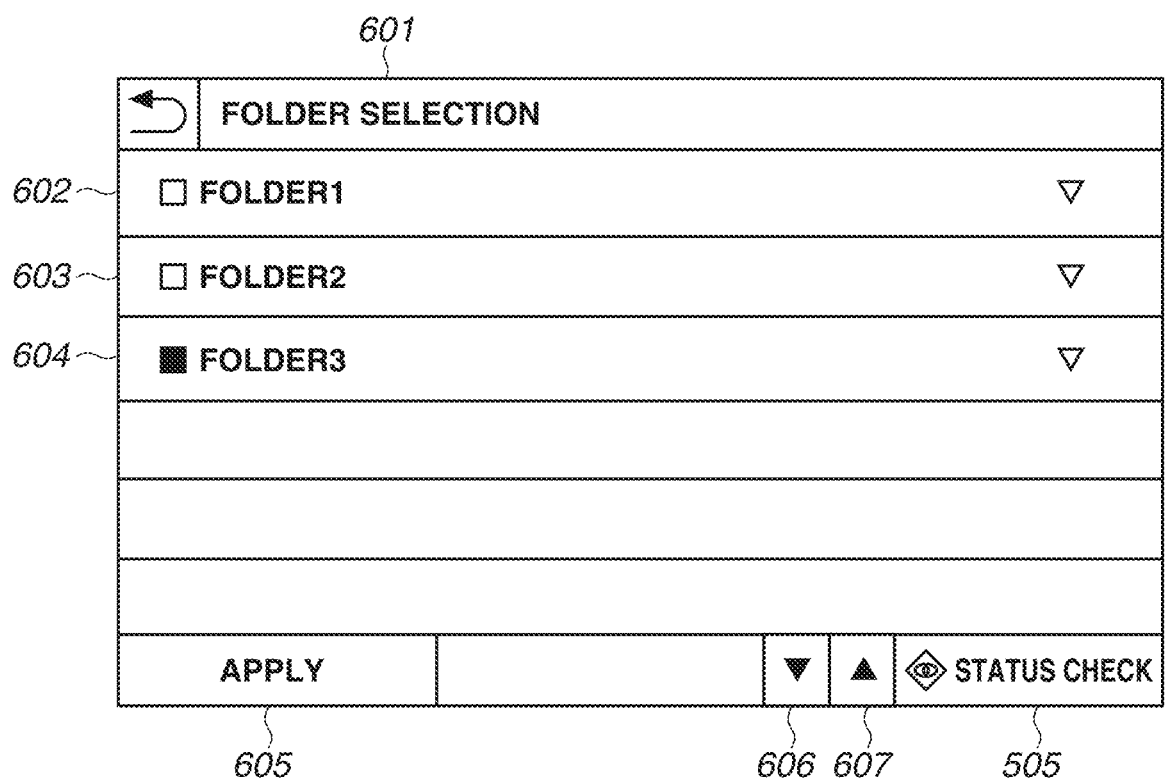
FIG. 6 illustrates a state where an operation unit displays a folder list indicated by Scan To Office executed on the MFP.

A button 512 is an object for displaying a Folder Selection screen for Scan to Office processing. When the user selects the button 512, a Folder Selection screen 601 in FIG. 6 is displayed on the operation unit 116. The Scan to Office processing will be described in detail below with reference to FIGS. 6 to 12.

A Scan button 503 is an object for displaying a Scan Selection screen (not illustrated). The Scan Selection screen is used to select each of transmission functions such as E-mail transmission, file transmission with SMB, FTP, and HyperText Transfer Protocol (HTTP), and Internet fax (I fax) transmission. When the user touches a displayed object indicating a transmission function, a screen for setting each transmission function is displayed.

An Address Book button 504 is an object for displaying an address book screen of the MFP 100. The LEDs 510 and 511 notify the user of the status of the MFP 100. The LED 510 goes ON during reception of an E-mail and during execution of a print job. The LED 511 goes ON when a certain error occurs in the MFP 100. A Stop button 506 is an object for canceling various operations. The Stop button 506 is constantly displayed on the operation unit 116. A Home button 507 is an object for displaying the Home screen 508. The Home button 507 is constantly displayed on the operation unit 116. A Menu button 509 is an object for displaying a screen for performing environmental setting such as the language to be used and setting various setting values for each function.

FIG. 6 illustrates an example of the Folder Selection screen 601. The Folder Selection screen 601 is displayed on the operation unit 116 after the user selects the button 512. This screen is a folder selection screen that can be used by the Scan to Office function of the MFP 100.

The Folder Selection screen 601 displays a FOLDER1 button 602, a FOLDER2 button 603, and a FOLDER3 button 604. When the user selects any one of the buttons 602 to 604 or selects a target folder by using selection buttons 606 and 607 and then presses an Apply button 605, the target folder is determined. Referring to the example in FIG. 6, FOLDER3 is selected.

The folder list illustrated in FIG. 6 is displayed when the user accesses a server or folder indicated by a Uniform Resource Locator (URL) or path registered in advance by the user. More specifically, information for accessing the server storing folders or the folders displayed in the Folder Selection screen 601 are registered in advance. The information can be registered in association with the button 512. When information about another server or folder is to be registered, the information can be registered in association with a different button. This eliminates the need of changing the information about the server or folder each time the user wants to change the target folder list.

As the folder list displayed in the Folder Selection screen 601, a list of folders stored in the storage 114 of the MFP 100 may be displayed. In addition, folders stored in the storage 114, folders stored in the file server 400, and folders stored in the cloud server 300 may be displayed at the same time.

Figure 7:
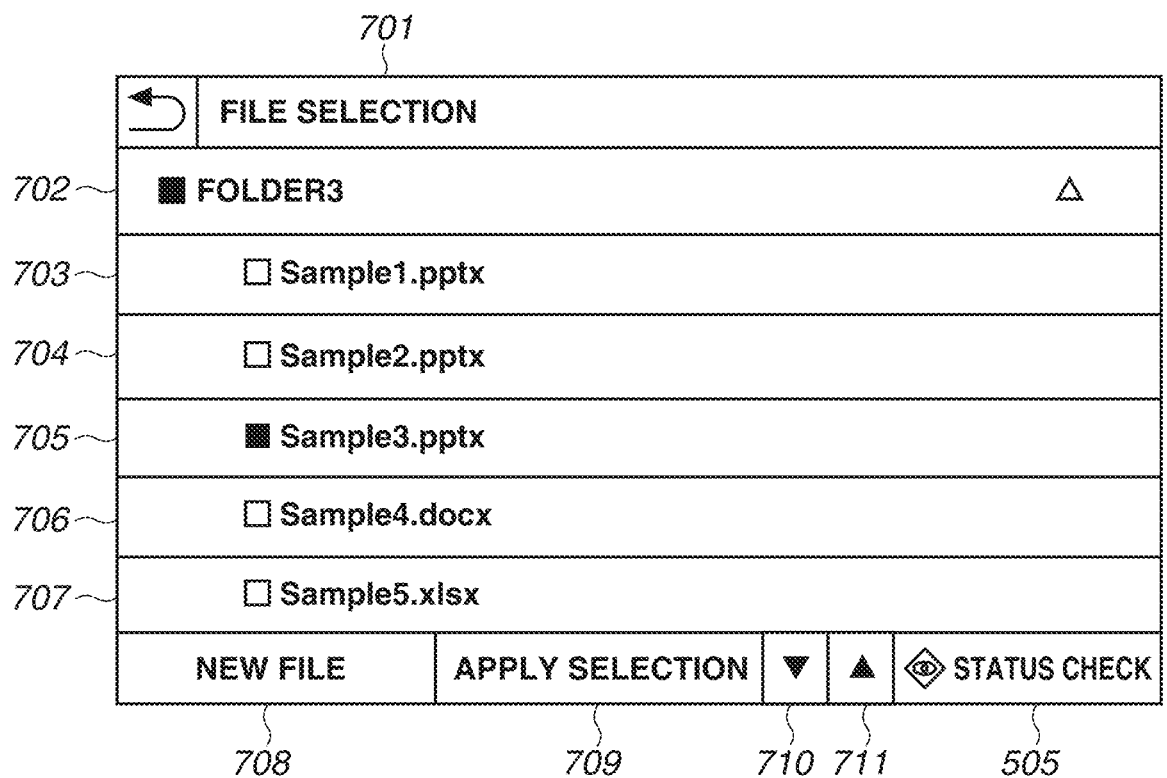
FIG. 7 illustrates a state where the operation unit displays a file list in a folder selected in the folder list in FIG. 6.

FIG. 7 illustrates an example of a File Selection screen 701. The File Selection screen 701 is displayed on the operation unit 116 after a folder is selected in the Folder Selection screen 601. When the user selects the FOLDER3 button 604, the display changes to a FOLDER3 button 702, and buttons 703 to 707 corresponding to files stored in the FOLDER3 button 702 are displayed.

When the user selects any one of the buttons 703 to 707 corresponding to different files, or selects a target file by using selection buttons 710 and 711 and then presses an Apply Selection button 709, the target file is determined. Referring to the example in FIG. 7, "Sample3.pptx" is selected as the target file. A new file can be generated in FOLDER5 by pressing a New File button 708. The generated file can also be selected as the target file.

The File Selection screen 701 allows the user to select a plurality of files as a plurality of target files.

FIG. 8 illustrates an example of a Preview Display screen 801. The Preview Display screen 801 displayed on the operation unit 116 indicates a state where a preview image of the file selected in the File Selection screen 701 is displayed on the operation unit 116. For File Name 802, the file name selected in the File Selection screen 701 is displayed. An image 803 indicates the image on the first page. An image 808 on the second page is displayed by pressing a Next Page button 804. The display can be changed to an image 809 with a similar operation. To change the image 809 to the image 808, a Previous Page button 805 is pressed. When the user presses a Select Page button 806 with any page displayed, the target page is determined, and information about the page displayed upon depression of the Select Page button 806 is stored in the RAM 113. According to the present exemplary embodiment, the Select Page button 806 is selected with the image 809 displayed, and the image 809 is determined as the image capturing target page.

When the user presses an Add Page button 807, a new page is generated, and the new page is determined as the target page. When the user generates a new file by selecting the New File button 708, the user needs to generate a new page by pressing the Add Page button 807.

A PowerPoint file is selected in the example in FIG. 8. However, when an Excel file is selected in the File Selection screen 701, a preview image of the Excel file is displayed. When an Excel file is displayed, a sheet specification is received instead of a page selection, and a preview image of the specified sheet is displayed.

FIG. 9 illustrates an example of a scan setting (Scan to Office) screen 901. When the target page is determined in the Preview Display screen 801, the Scan to Office screen 901 is displayed on the operation unit 116. A Read Settings display 902 indicates that the MFP 100 is in a read setting state. When a Read Size button 903 is selected, a screen for setting the read size is displayed. When a Resolution button 904 is selected, a screen for setting the read resolution is displayed. A Read Mode button 905, a Contour Enhancement button 906, a White Background Removal button 907 are displayed. The MFP 100 may automatically recognize the document type and adjust setting items. To return the read setting values to the default setting values, the user presses a Reset button 908. After setting the read setting values, the user presses a Start Monochrome Scan button 909 or a Start Color Scan button 910 to start document scanning and generate image data. The reading unit 118 is provided with a stacking unit on which a plurality of document sheets can be stacked. When the Start Monochrome Scan button 909 or the Start Color Scan button 910 is selected with a plurality of document sheets stacked, the plurality of document sheets is scanned in succession and a plurality of image data pieces is generated. This means that the stacking unit allows the user to scan a plurality of document sheets and generate a plurality of image data pieces by issuing a single execution instruction. When a plurality of document sheets is scanned and image data is generated, the user may add the plurality of image data pieces to a specified page, or specify a page to be subjected to image data insertion for each of the plurality of image data pieces.

FIG. 10 illustrates an example of a Layout Display screen 1001. The Layout Display screen 1001 displayed on the operation unit 116 is used to combine the page specified in the Preview Display screen 801 in FIG. 8 with the image of the image data generated by scanning a document with the read setting values in FIG. 9, and display a preview of the resultant composite image. More specifically, a composite image 1003 is displayed by combining the image 809 with an image 1004 of the image data generated by scanning a document 1002. Arrows 1005, 1006, 1007, and 1008 allow the user to move the image 1004 within the display area of the composite image 1003 to determine the layout. Movement buttons 1009, 1010, 1011, and 1012 allow the user to specify the position where the image is to be added. An Apply button 1013 allows the user to determine the layout. The layout adjustment is not limited to the movement of the coordinates of the image 1004. The user may specify the movement of an object included in the image 809 before the combination to the foreground or background, and specify image processing such as the determination of whether the off-bit region of the image 1004 is to be handled as a white or transparent image. The user may also be allowed to adjust the size of the image 1004.

Even when an Excel file is selected in the File Selection screen 701, the CPU 111 receives a position specification on the Excel sheet specified in FIG. 9. For an Excel file, the user may specify a position by using the movement buttons as illustrated in FIG. 10, or the CPU 111 may receive a position specification based on a cell on the Excel sheet.

Figure 11:
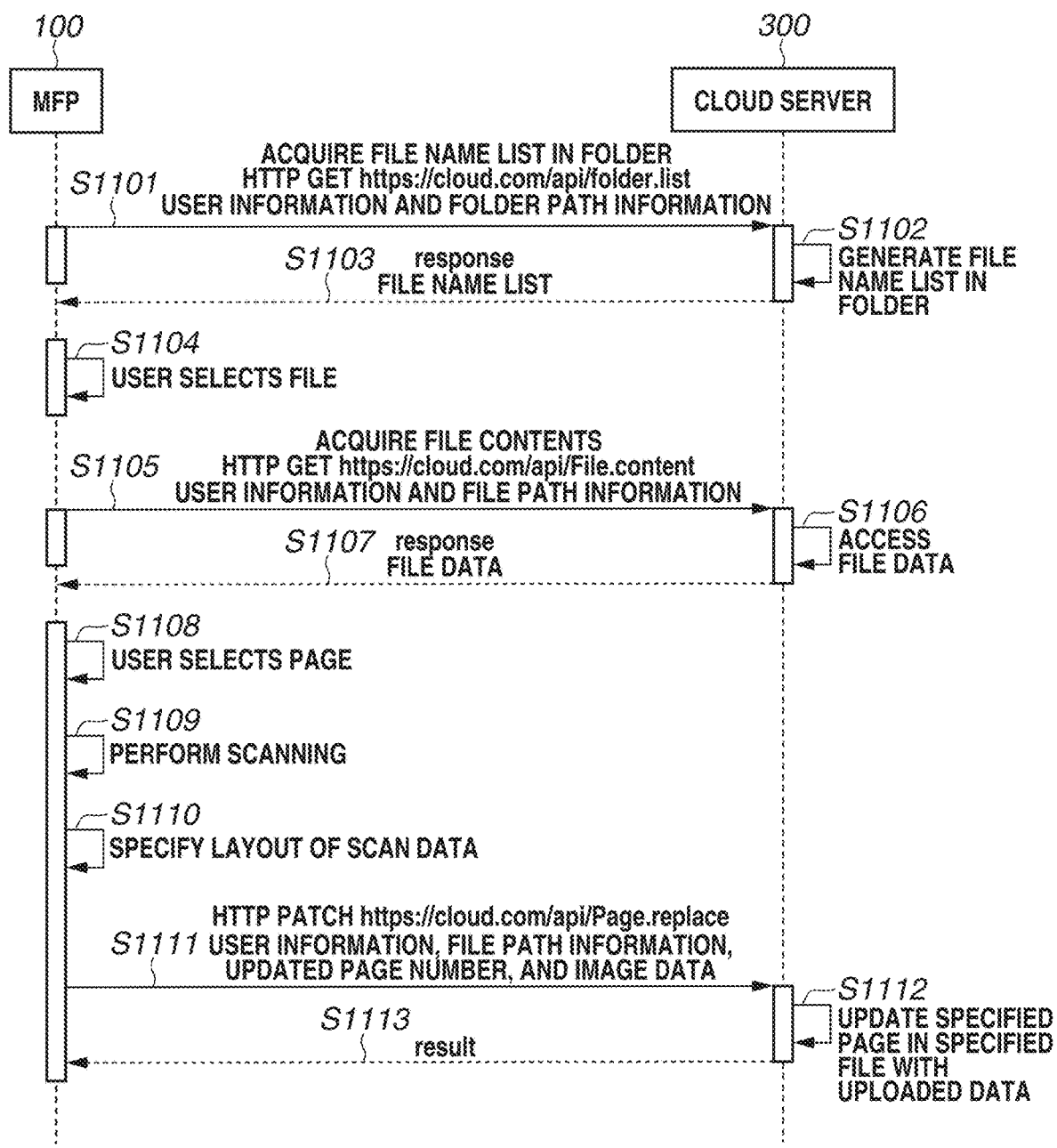
FIG. 11 is a sequence diagram illustrating processing for adding a scanned image to a file on the cloud server.

FIG. 11 is a sequence diagram illustrating an example of processing for adding an image to a file on the cloud server 300. The sequence in FIG. 11 is started when the FOLDER3 button 604 in FIG. 6 is selected.

In step S1101, the CPU 111 of the MFP 100 controls the communication unit 126 to perform HTTP communication with the cloud server 300 to transmit thereto a request for acquiring the file name list stored in a folder. More specifically, the CPU 111 transmits the user information input on the MFP 100 by the user, URL or folder path information, and information indicating a request for file names stored in the folder path to the cloud server 300. By transmitting the user information input on the MFP 100 to the cloud server 300, the CPU 111 identifies information related to the user identifier (ID) in the folder path. Further, to allow only the user to read and write file information in the folder path, the user acquires the relevant authority by transmitting password information corresponding to the user information input on the MFP 100 to the cloud server 300.

An example of a command transmitted in this case is "HTTP GET https://cloud.com/api/folder.list". The URL "https://cloud.com/api/folder.list" described in this command is the URL for accessing the cloud server 300. When the user information and the folder path information are transmitted to this URL, the cloud server 300 searches for file names corresponding to the folder path information.

In step S1102, the CPU 301 of the cloud server 300 checks whether the access to the URL is permitted, based on the user information and the folder path information received from the MFP 100 via the communication unit 304. If the access is permitted, the CPU 301 generates a file name list included in the folder corresponding to the folder path information. The file name list refers to information about an arrangement of the file names included in the specified folder path. The file name list includes file names and file attribute information.

In step S1103, the CPU 301 of the cloud server 300 controls the communication unit 304 to transmit to the MFP 100 the file name list information generated in step S1102, as response information to the HTTP communication.

In step S1104, the CPU 111 of the MFP 100 displays the File Selection screen 701 on the touch panel of the operation unit 116 based on the file names included in the received file name list information, and waits until the user selects the Apply Selection button 709 or the buttons 703 to 707. The present exemplary embodiment will be described below centering on a case where "Sample3.pptx" is selected as the target file by the Apply Selection button 709. According to the present exemplary embodiment, examples of files that may be displayed in the File Selection screen 701 include a PowerPoint file used by a presentation tool, an Excel file used by a spreadsheet tool, and a Word file used by a document creation tool.

In step S1105, the CPU 111 of the MFP 100 controls the communication unit 126 to perform HTTP communication with the cloud server 300 to transmit thereto a request for acquiring the content of the file "Sample3.pptx" determined as the target file. An example of a command transmitted in this case is "HTTP GET https://cloud.com/api/File.content". The URL "https://cloud.com/api/File.content" described in this command is the URL for accessing the cloud server 300. When the user information and the file path information for "Sample3.pptx" are transmitted to this URL, the cloud server 300 searches for the content of the file "Sample3.pptx".

In step S1106, the CPU 301 of the cloud server 300 checks whether the access to the URL is permitted, based on the user information and the file path information received from the MFP 100 via the communication unit 304. If the access is permitted, the CPU 301 searches for the file corresponding to the file path information and accesses the file content. More specifically, to prepare for the transmission of the file content, the CPU 301 loads the content of the file data into the file data buffer in the RAM 303.

In step S1107, the CPU 301 of the cloud server 300 controls the communication unit 304 to transmit to the MFP 100 the file found in the search, as response information to the HTTP communication.

In step S1108, the CPU 111 of the MFP 100 stores the received content of the file "Sample3.pptx" in the RAM 113, analyzes the file content, and displays a preview as the Preview Display screen 801. Then, the CPU 111 receives a selection of the target page from the user. The CPU 111 may temporarily store the received content of the file "Sample3.pptx" in a file in the storage 114, read data required to display a preview for each page into the buffer in the RAM 113, and display a preview. If direct file reference is difficult due to the received content of the file "Sample3.pptx" being compressed, for example, the CPU 111 temporarily stores the file content in a file in the storage 114 and further temporarily stores the file content in a decompressed state in the storage 114. The CPU 111 may read data required to display a preview for each page into the buffer in the RAM 113, and display a preview.

In step S1109, the CPU 111 of the MFP 100 controls the reading unit 118 to scan the image of the document upon selection of the Start Monochrome Scan buttons 909 or the Start Color Scan button 910 in the Scan to Office screen 901, and generates image data. The CPU 111 generates the image data set in the Scan to Office screen 901.

In step S1110, the CPU 111 of the MFP 100 combines the image data generated in step S1109 with the image 809 determined as the target page, and displays the resultant composite image in the Layout Display screen 1001. Then, the CPU 111 receives an operation for editing the layout from the user.

In step S1111, the CPU 111 of the MFP 100 determines the layout by a layout determination operation upon depression of the Apply button 1013 in step S1110, and transmits the composite image having the determined layout to the cloud server 300.

More specifically, the CPU 111 transmits the user information input on the MFP 100, the file path information, the generated composite image, and information indicating a request for updating the page content to the cloud server 300. An example of a command transmitted in this case is "HTTP PATCH https://cloud.com/api/Page.replace". The URL "https://cloud.com/api/Page.replace" described in this command is the URL for accessing the cloud server 300. When the user information, the file path information, the update page information, and the image data are transmitted to this URL, the cloud server 300 updates the page content of the file corresponding to the transmitted information. The content to be transmitted includes not only the target page but also the entire content of "Sample3.pptx". In this case, the MFP 100 receives the entire content of the selected file from the cloud server 300, and the CPU 111 of the MFP 100 updates the file by using the composite image.

In step S1112, the CPU 301 of the cloud server 300 checks whether the access to the URL is permitted, based on the user information, the file path information, the update page information, and the image data received from the MFP 100 via the communication unit 304. If the access is permitted, the CPU 111 performs processing for adding the image data to the specified position on the page specified by the update page information for the file corresponding to the file path information.

In step S1113, the CPU 301 of the cloud server 300 controls the communication unit 304 to transmit to the MFP 100 the result of the update processing in step S1112 as response information to the HTTP communication. If the update processing is successful, the CPU 111 of the MFP 100 may display a notification about the successful update processing on the operation unit 116. If the update processing fails, the CPU 111 of the MFP 100 may display a notification about the failed update processing on the operation unit 116. In addition, the CPU 111 may display no notification when the update processing is successful and display a notification about the failed update processing only when the update processing fails.

Thus, the user can select an existing file and add the image data generated by scanning a document to the file. More specifically, the CPU 111 of the MFP 100 performs processing for adding the image data to the file, and the CPU 301 of the cloud server 300 actually adds the image data. The CPU 111 of the MFP 100 may perform processing for adding the image data to the file, perform processing to actually add the image data, and transmit the updated file to the cloud server 300.

If the cloud server 300 is to add the image data, the MFP 100 transmits the image data, file information, page information, and position information to the cloud server 300, and the CPU 301 of the cloud server 300 adds the generated image data to the selected file.

The file selected in the File Selection screen 701 may be a file stored in an external apparatus or storage such as the cloud server 300, or a file stored in the storage 114 of the MFP 100.

An existing file refers to a file stored in the cloud server 300 or the storage 114 before the MFP 100 performs scan to generate image data to be added to the file.

Figure 12:
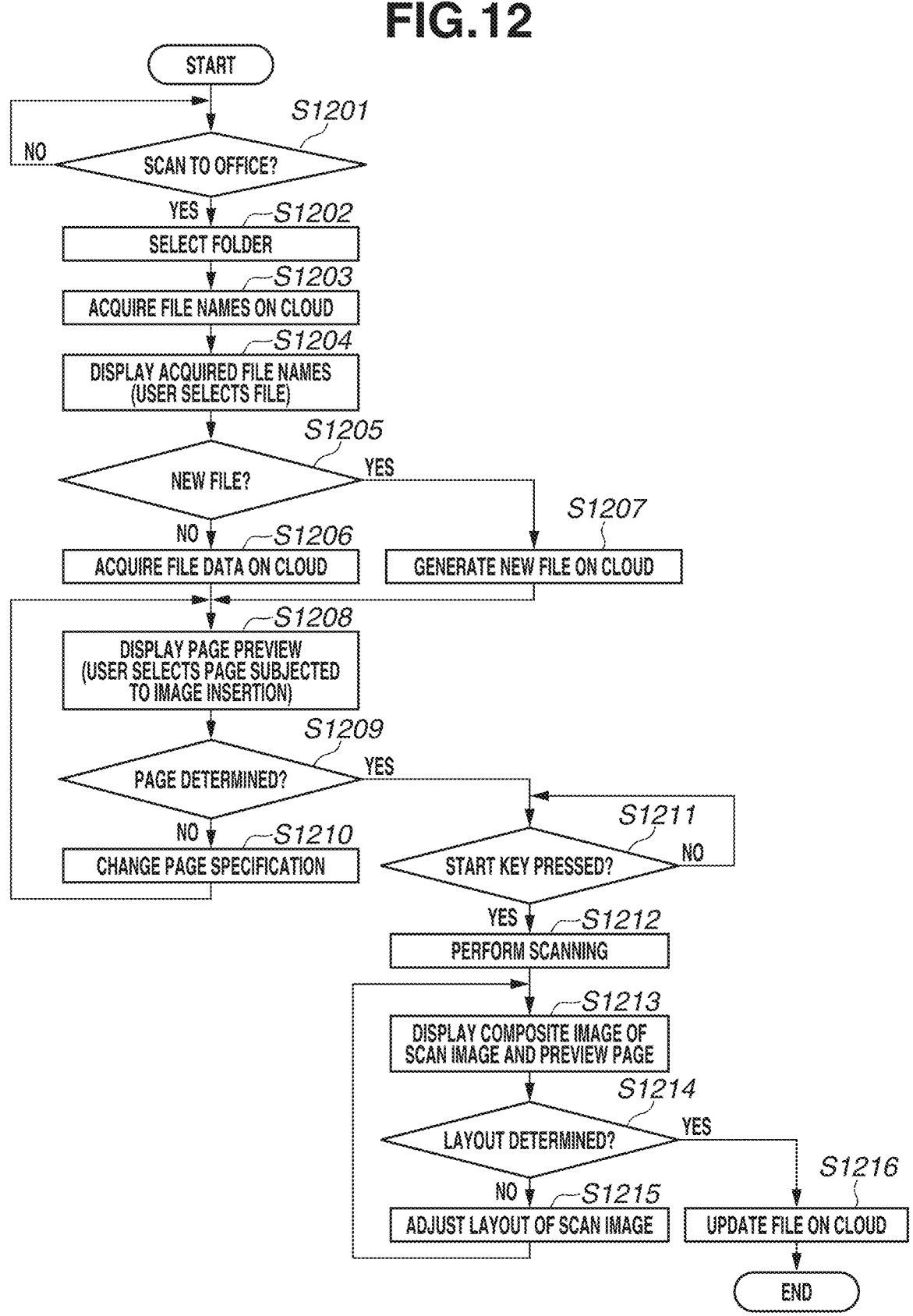
FIG. 12 is a flowchart illustrating processing performed by the MFP to add a scanned image to a file on the cloud server.

FIG. 12 is a flowchart illustrating an example of processing for adding an image to a file on the cloud server 300. The processing of the flowchart in FIG. 12 is implemented when the CPU 111 loads a program stored in the ROM 112 into the RAM 113 and executes the program. The flowchart in FIG. 12 is started when power of the MFP 100 is turned ON.

In step S1201, the CPU 111 determines whether the button 512 is selected. If the CPU 111 determines that the button 512 is selected (YES in step S1201), the processing proceeds to step S1202. On the other hand, if the CPU 111 does not determine that the button 512 is selected (NO in step S1201), the processing repeats step S1201.

In step S1202, the CPU 111 displays the Folder Selection screen 601 on the operation unit 116, and waits until the user selects a folder. When the user selects a folder and presses the Apply button 605, the CPU 111 stores the folder information for the selected folder in the RAM 113. Then, the processing proceeds to step S1203.

In step S1203, the CPU 111 controls the communication unit 126 to perform HTTP communication with the cloud server 300 to transmit thereto a request for acquiring the file name list stored in the folder stored in the RAM 113.

In step S1204, the CPU 111 displays the File Selection screen 701 on the operation unit 116 based on the file list received from the cloud server 300, and waits until the user selects a file. When the user selects a target file and presses the Apply Selection button 709, the CPU 111 stores information indicating the selected target file in the RAM 113. Then, the processing proceeds to step S1205. When the user presses the New File button 708 in step S1204, the CPU 111 stores information indicating an instruction for generating a new file in the RAM 113. Then, the processing proceeds to step S1205.

In step S1205, the CPU 111 determines whether information indicating an instruction for generating a new file is stored in the RAM 113. If an instruction for generating a new file is stored (YES in step S1205), the processing proceeds to step S1207. On the other hand, if no instruction for generating a new file is stored (NO in step S1205), the processing proceeds to step S1206.

In step S1206, the CPU 111 controls the communication unit 126 to transmit information about the target file stored in the RAM 113 to the cloud server 300 as a request for acquiring the file data on the cloud. Then, the CPU 111 receives the specified file data and stores the received content of the file "Sample3.pptx" in the RAM 113.

In step S1207, the CPU 111 controls the communication unit 126 to transmit a request for generating a new file to the cloud server 300. Then, the processing proceeds to step S1208.

In step S1208, the CPU 111 analyzes the file data and displays the Preview Display screen 801. When the user selects a target page, the processing proceeds to step S1209.

In step S1209, the CPU 111 determines whether a target page is determined. When the CPU 111 determines that a target page is selected or a page is added (YES in step S1209), the processing proceeds to step S1211.

On the other hand, when the user performs an operation for changing the preview display to another page (NO in step S1209), the processing proceeds to step S1210.

In step S1210, the CPU 111 changes the page to be displayed as a preview. In step S1208, the CPU 111 displays the preview again.

In step S1211, the CPU 111 displays the Scan to Office screen 901, and determines whether the user presses the Start Monochrome Scan button 909 or the Start Color Scan button 910 after setting the read setting values. If neither button is pressed (NO in step S1211), the processing repeats step S1211. On the other hand, if the user presses the Start Monochrome Scan button 909 or the Start Color Scan button 910 after setting the read setting values (YES in step S1211), the processing proceeds to step S1212.

In step S1212, the CPU 111 controls the reading unit 118 based on the scan setting values set in the Scan to Office screen 901 to scan a document image and generate image data. The scan setting values are specified by the user in the Scan to Office screen 901.

In step S1213, the CPU 111 combines the image data generated in step S1212 with the image 809 specified in FIG. 8 and displays the resultant composite image 1003. Then, the CPU 111 receives a layout specification for the image of the generated image data via the operation unit 116.

In step S1214, the CPU 111 determines whether the layout adjustment is completed.

If the Apply button 1013 is pressed and the CPU 111 determines the button depression as an instruction for determining the layout (YES in step S1214), the processing proceeds to step S1216. On the other hand, if a button other than the Apply button 1013 is pressed (NO in step S1214), the processing proceeds to step S1215.

In step S1215, if the CPU 111 determines that the movement button 1009, 1010, 1011, or 1012 is pressed, the CPU 111 adjusts the layout according to each movement instruction and generates the composite image 1003. Then, the processing returns to step S1213.

In step S1216, the CPU 111 transmits the data generated based on the composite image 1003 to the cloud server 300. Then, the processing exits the flowchart.

The above-described processing enables updating the third page of the existing file (Sample3.pptx) stored in the cloud server 300.

The first exemplary embodiment has been described centering on the processing for adding the image data generated by scanning a document, to a file stored in the cloud server 300. A second exemplary embodiment will be described below centering on processing for adding the image data generated by scanning a document, to a file stored in the file server 400 with which the MFP 100 can connect via Server Message Block (SMB) communication.

Figure 13:
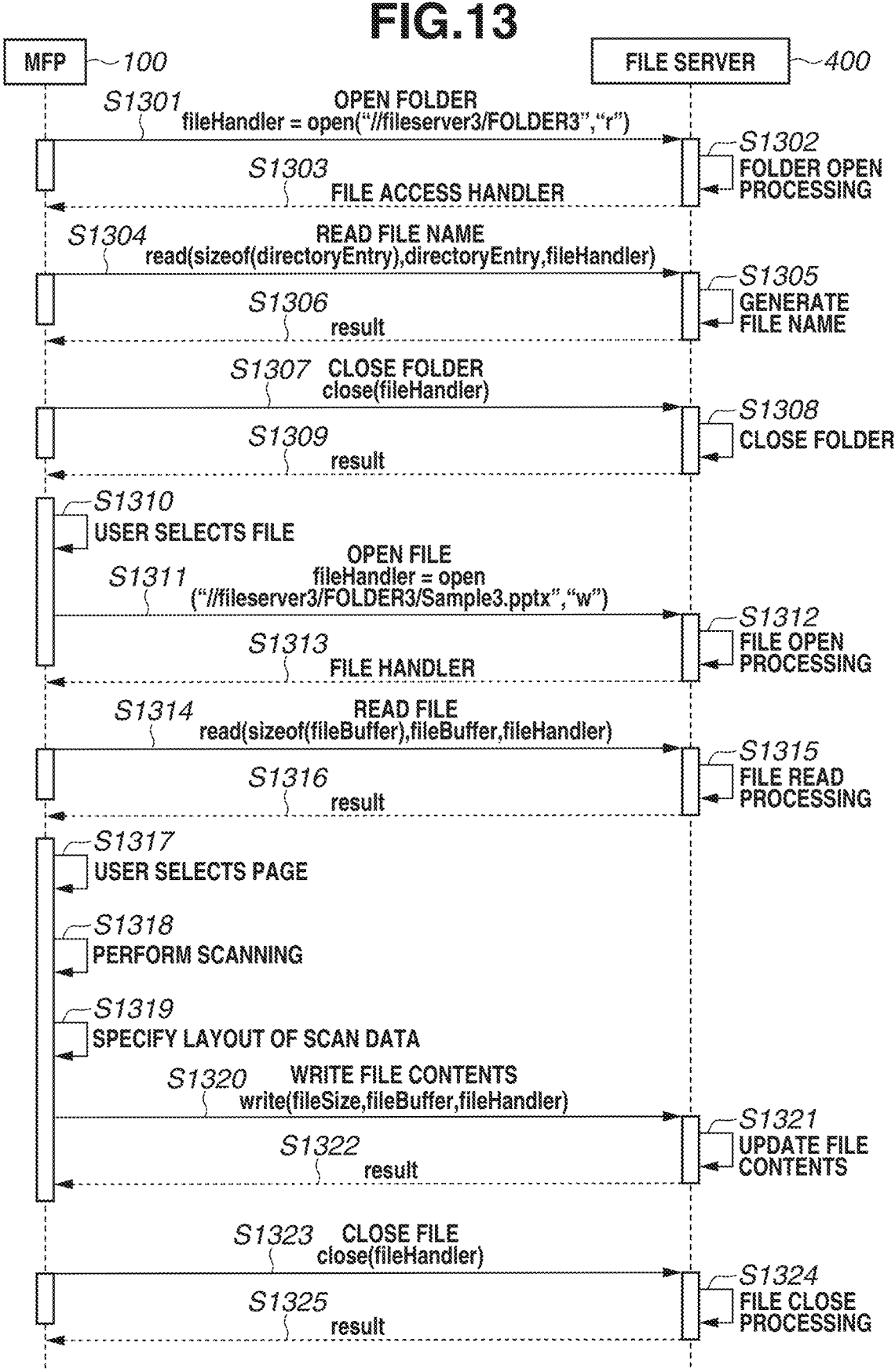
FIG. 13 is a sequence diagram illustrating processing for adding a scanned image to a file on the file server.

FIG. 13 is a sequence diagram illustrating processing for adding a scanned image to a file on the file server 400. Generally, SMB or Network File System (NFS) communication is used to access a file server. The above-described communication involves processing similar to the common File System functions to maintain the handling compatibility with local files. According to the present exemplary embodiment, the function generally referred to as BOX provided in the storage 114 of the MFP 100 also involves similar processing. Therefore, the present exemplary embodiment will be described below centering on a directory-entry format having the common File System functions and folder configurations.

The sequence in FIG. 13 is started when the "FOLDER3" 604 is selected by depression of the Apply button 605 in FIG. 6.

In step S1301, the CPU 111 of the MFP 100 controls the communication unit 126 to communicate with the file server 400 to transmit thereto a request for acquiring file names stored in the specified folder. More specifically, the CPU 111 of the MFP 100 controls the communication unit 126 to communicate with the file server 400 to transmit thereto a request for opening the directory of the specified folder.

An example of a command transmitted in this case is "open("//fileserver3/FOLDER3","r")". This command performs processing for opening the folder/FOLDERS of a file server "fileserver3" and acquires the file names included in the directory entry.

In step S1302, the CPU 401 of the file server 400 checks whether the access to the specified folder path is permitted, based on the user information and the folder path information received from the MFP 100 via the communication unit 404. If the access is permitted, the CPU 401 performs processing for opening the folder corresponding to the folder path information, and the File System generates a file access table (not illustrated) for accessing the folder in the RAM 403. The file access table includes access position information for reading and writing a file, open mode information indicating whether the file is opened on a read only basis or on a read/write basis, and file attribute information. The file access table serves as information used for the internal processing of the File System module. Direct reference from the outside of the File System is inhibited to assure operations and independence of the file processing. To specify a file or folder to be processed from the outside of the File System, a file access handler is returned as a return value in each piece of the open processing. The file access handler serves as file reference information corresponding to the generated file access table. The returned file access handler can be specified in File System functions such as read and write functions. The file access handler is enabled until processing with a file access handler specification is performed in the close processing, and disabled after the close processing.

In step S1303, the CPU 401 of the file server 400 controls the communication unit 404 to transmit to the MFP 100 the file access handler on the folder path generated in step S1302, as communication response information.

In step S1304, the CPU 111 of the MFP 100 transmits to the file server 400 a request for acquiring the directory entry information included in the folder path by using the received file access handler. The directory entry information refers to a package of file attributes including the file name and the file generation time. An example of a transmitted command in this case is "read(sizeof (directoryEntry),directoryEntry, fileHandler)".

In step S1305, the CPU 401 of the file server 400 generates the directory entry information according to the file access handler received from the MFP 100 via the communication unit 304 and generates file names.

In step S1306, the CPU 401 of the file server 400 controls the communication unit 404 to transmit to the MFP 100 the directory entry information generated in step S1305, as communication response information.

The sequence of steps S1304, S1305, and S1306 is repeated for the number of file names.

In step S1307, the CPU 111 of the MFP 100 transmits to the file server 400 a request for ending the processing on the folder path, by using the received file access handler. An example of a transmitted command in this case is "close (fileHandler)".

In step S1308, the CPU 401 of the file server 400 ends the access to the file path specified by the file access handler, according to the file access handler received from the MFP 100 via the communication unit 404.

In step S1309, the CPU 401 of the file server 400 controls the communication unit 404 to transmit to the MFP 100 the result of closing the folder in step S1308 as communication response information.

In step S1310, the CPU 111 of the MFP 100 displays the File Selection screen 701 on the touch panel of the operation unit 116 based on the file names included in the received directory entry information, and then waits for a user operation with the Apply Selection button 709. The present exemplary embodiment will be described below centering on a case where "Sample3.pptx" is selected as an image capturing target file by using the Apply Selection button 709.

In step S1311, the CPU 111 of the MFP 100 controls the communication unit 126 to communicate with the file server 400 to transmit thereto a request for opening the file "Sample3.pptx" determined by the Apply Selection button 709. An example of a transmitted command in this case is "open("//fileserver3/FOLDER3/Sample3.pttx","w")".

In step S1312, the CPU 401 of the file server 400 checks whether the access to the specified file path is permitted, based on the command and information received from the MFP 100 via the communication unit 404. If the access is permitted, the CPU 111 searches for the file corresponding to the file path information, performs the open processing for accessing the file content, and generates a file access handler for accessing the file content.

In step S1313, the CPU 401 of the file server 400 controls the communication unit 404 to transmits to the MFP 100 the file access handler generated in step S1312 as communication response information.

In step S1314, the CPU 111 of the MFP 100 transmits to the file server 400 a request for acquiring the content of the file specified in the file path, by using the file access handler. An example of a transmitted command in this case is "read(sizeof (fileBuffer),fileBuffer,fileHandler). In this example, the CPU 111 requests the file server 400 to read the file for the buffer size.

In step S1315, the CPU 401 of the file server 400 performs processing for transmitting the file content according to the file access handler received from the MFP 100 via the communication unit 304. If the specified read size is larger than the actual file size, the CPU 401 reads the file for the actual file size.

In step S1316, the CPU 401 of the file server 400 controls the communication unit 404 to transmit to the MFP 100 the file content prepared in step S1315 and read data size as communication response information.

In step S1317, the CPU 111 of the MFP 100 stores the received content of the file "Sample3.pptx" in a receive file data buffer in the RAM 113. Then, the CPU 111 analyzes the content of the receive file data buffer, displays a preview in the Preview Display screen 801, and waits for a user operation for determining the image capturing target page with the Select Page button 806. The CPU 111 also compares the received read data size with the receive buffer data size transmitted upon a reading request, to determine whether the entire content of the file subjected to an acquisition request have been stored in the receive buffer. The exemplary embodiment will be described below centering on a state where the entire content of the file are stored in the receive buffer. In a case where the CPU 111 determines that the entire content of the file cannot be stored in the receive buffer, the CPU 111 temporarily stores the received content of the file "Sample3.pptx" in a file in the storage 114. The CPU 111 may read data required to display a preview for each page into the buffer in the RAM 113 and display a preview. If direct file reference is difficult due to the received content of the file "Sample3.pptx" being compressed, for example, the CPU 111 temporarily stores the file content in a file in the storage 114 and further temporarily stores the file content in a decompressed state in the storage 114. The CPU 111 may read data required to display a preview for each page into the buffer in the RAM 113 and display a preview.

In step S1318, the CPU 111 of the MFP 100 performs scanning based on a user operation for determining the image capturing target page with the Select Page button 806 and selection of the Start Monochrome Scan button 909 or the Start Color Scan button 910 in the Scan to Office screen 901. Then, the CPU 111 generates image data set in the Scan to Office screen 901.

In step S1319, the CPU 111 of the MFP 100 combines the image data generated in step S1318 with the image 809 determined as the image capturing target page with the Select Page button 806, displays the composite image in the Layout Display screen 1001, and waits for a layout determination operation by the user.

In step S1320, the CPU 111 of the MFP 100 determines the layout as the image capturing target page through the layout determination operation by depression of the Apply button 1013 in step S1319, and transmits the target composite page to the file server 400. More specifically, to transmit the updated content of the receive buffer, the CPU 111 calculates the file size after the update. For example, the calculated file size is fileSize. The CPU 111 transmits to the file server 400 a request for writing the file access handler, the file size, the content of the receive buffer, and the transmit data to a file. An example of a transmitted command in this case is "write(fileSize,fileBuffer,fileHandler)".

Upon transmission of this command, the file server 400 writes the relevant information to the file corresponding to the transmitted information.

In step S1321, the CPU 401 of the file server 400 updates the content of the file corresponding to the file access handler with the received image data based on the file access handler and the image data received from the MFP 100 via the communication unit 404.

In step S1322, the CPU 401 of the file server 400 controls the communication unit 404 to transmit to the MFP 100 the result of the command in step S1321 as communication response information.

In step S1323, the CPU 111 of the MFP 100 transmits to the file server 400 a request for ending the processing on the file path by using the received file access handler. An example of a transmitted command in this case is "close (fileHandler)".

In step S1324, the CPU 401 of the file server 400 ends the access to the file path specified by the file access handler according to the file access handler received from the MFP 100 via the communication unit 304.

In step S1325, the CPU 401 of the file server 400 controls the communication unit 404 to transmit to the MFP 100 the result of the close processing in step S1323 as communication response information. If the close processing is successful, the CPU 111 of the MFP 100 may display a notification about the successful close processing on the operation unit 116. If the close processing fails, the CPU 111 of the MFP 100 may display a notification about the failed close processing on the operation unit 116. In addition, the CPU 111 may display no notification when the close processing is successful and display a notification about the failed close processing only when the close processing fails.

Figure 14:
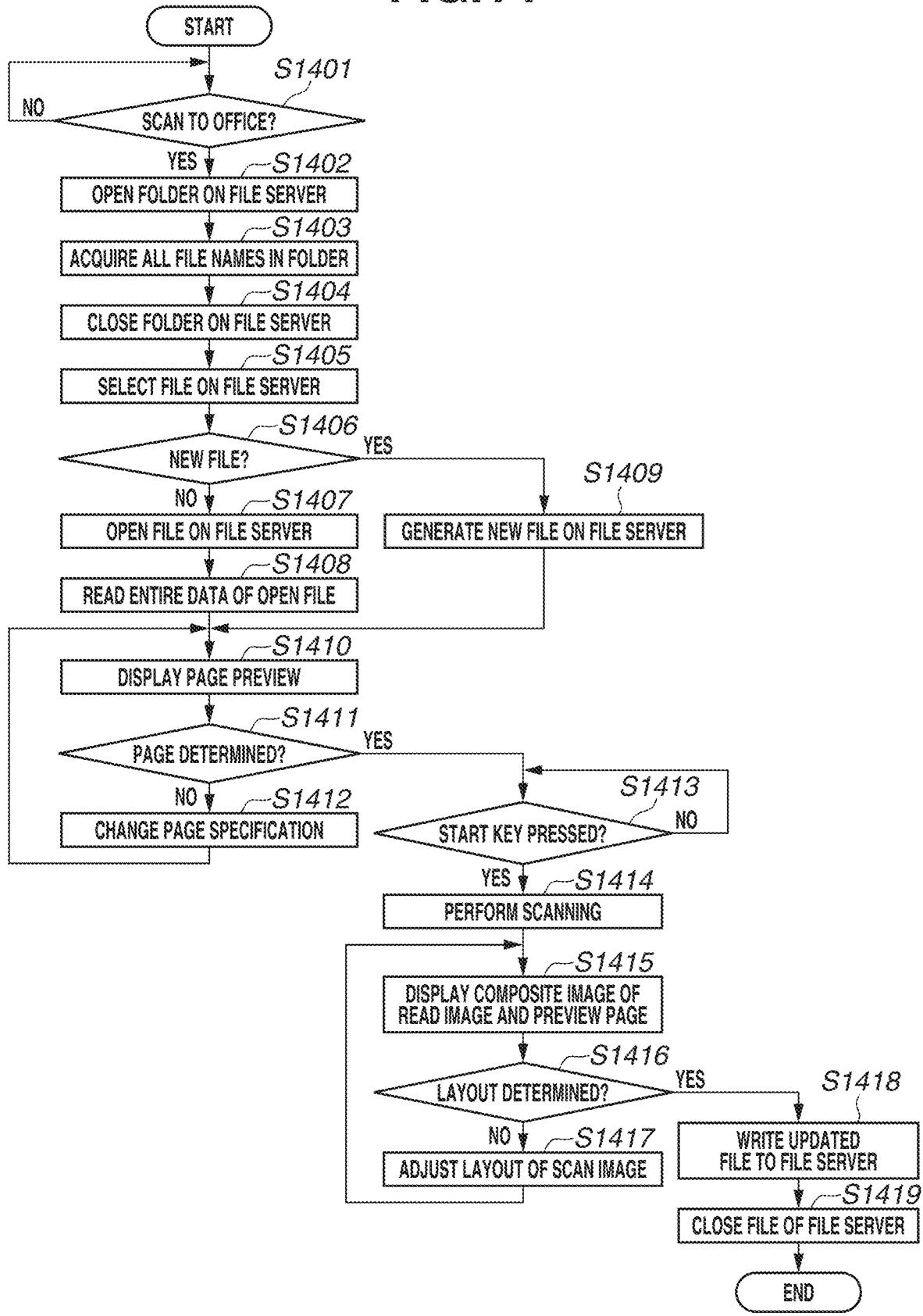
FIG. 14 is a flowchart illustrating processing performed by the MFP to add a scanned image to a file on the file server.

FIG. 14 is a flowchart illustrating processing performed by the MFP 100 to add a scanned image to a file on the file server 400.

The processing of the flowchart in FIG. 14 is implemented when the CPU 111 loads a program stored in the ROM 112 into the RAM 113 and executes the program. The flowchart in FIG. 14 is started when power of the MFP 100 is turned ON.

In step S1401, the CPU 111 determines whether the button 512 is selected. If the CPU 111 determines that the button 512 is selected (YES in step S1401), the processing proceeds to step S1402. On the other hand, if the CPU 111 does not determine that the button 512 is selected (NO in step S1401), the processing repeats step S1401.

In step S1402, the CPU 111 displays the Folder Selection screen 601 on the operation unit 116 and waits for a selected folder determination operation by the user. The CPU 111 stores folder information for the selected folder in the RAM 113, opens the corresponding folder of the file server 400 to acquire file names in the corresponding folder of the file server 400, and acquires the file access handler. Then, the processing proceeds to step S1403.

In step S1403, the CPU 111 of the MFP 100 controls the communication unit 126 to communicate with the file server 400 to transmit thereto a request for acquiring the file name list stored in the folder by using the file access handler.

In step S1404, the CPU 111 of the MFP 100 controls the communication unit 126 to transmit to the file server 400 a request for closing the folder corresponding to the file access handler.

In step S1405, the CPU 111 displays the File Selection screen 701 on the operation unit 116 based on the file list received from the file server 400, and waits for a selected file determination operation by the user. When a file is selected by depression of the Apply Selection button 709, the CPU 111 stores file information for the selected file in a file information storage area in the RAM 113. Then, the processing proceeds to step S1406. When the New File button 708 is pressed in step S1405, the CPU 111 stores the information indicating an instruction for generating a new file in the file information storage area in the RAM 113. Then, the processing proceeds to step S1406.

In step S1406, the CPU 111 determines whether information indicating an instruction for generating a new file is stored in the RAM 113. If an instruction for generating a new file is stored (YES in step S1406), the processing proceeds to step S1409. On the other hand, if no instruction for generating a new file is stored (NO in step S1406), the processing proceeds to step S1407.

In step S1407, the CPU 111 controls the communication unit 126 to transmit to the file server 400 a request for opening the file data, by using the selected file information stored in the RAM 113, and acquires the file access handler. Then, the processing proceeds to step S1408.

In step S1408, the CPU 111 controls the communication unit 126 to transmit to the file server 400 a request for acquiring the file data by using the file access handler acquired in step S1407. Then, the CPU 111 stores the content of the file "Sample3.pptx" in the RAM 113. Then, the processing proceeds to step S1410.

In step S1409, the CPU 111 controls the communication unit 126 to transmit to the file server 400 a request for generating a new file in a folder of the file server 400. Then, the processing proceeds to step S1410.

In step S1410, the CPU 111 analyzes the file data in the RAM 113, displays the Preview Display screen 801, and waits for a user operation for determining the image capturing target page with the Select Page button 806. When the user inputs an operation, the processing proceeds to step S1411.

In step S1411, the CPU 111 determines whether the image capturing target page is determined by the user with the Select Page button 806. If the CPU 111 determines that the Select Page button 806 or the Add Page button 807 is pressed (YES in step S1411), the processing proceeds to step S1413. On the other hand, if a different button is pressed (NO in step S1411), the processing proceeds to step S1412.

In step S1412, when the Next Page button 804 or the Previous Page button 805 is pressed and the CPU 111 determines that the display page can be changed according to the instruction, the CPU 111 changes page specification. Then, the processing returns to step S1410. In step S1410, the CPU 111 displays a preview again.

In step S1413, the CPU 111 displays the Scan to Office screen 901 and determines whether the user presses the Start Monochrome Scan button 909 or the Start Color Scan button 910 after setting the read setting values. If neither button is pressed (NO in step S1413), the processing repeats step S1413. On the other hand, if the user presses the Start Monochrome Scan button 909 or the Start Color Scan button 910 after setting the read setting values (YES in step S1413), the processing proceeds to step S1414.

In step S1414, the CPU 111 controls the reading unit 118 based on the scan setting values to scan the image of the document 1002 and generate image data. The scan setting values are specified in the Scan to Office screen 901 by the user.

In step S1415, the CPU 111 combines the image data generated in step S1414 with the image 809 specified in FIG. 8 and displays the composite image 1003.

In step S1416, the CPU 111 determines whether the layout adjustment is complete.

When the Apply button 1013 is pressed and the CPU 111 determines the button depression as an instruction for determining the layout (YES in step S1416), the processing proceeds to step S1418. On the other hand, when a button other than the Apply button 1013 is pressed (NO in step S1416), the processing proceeds to step S1417.

In step S1417, when the CPU 111 determines that the movement button 1009, 1010, 1011, or 1012 is pressed, the CPU 111 adjusts the layout according to each movement instruction and generates the composite image 1003. Then, the processing returns to step S1415.

In step S1418, the CPU 111 updates the content of the receive file data buffer in the RAM 113 according to the composite image capturing target page, and transmits the image data to the file server 400.

In step S1419, the CPU 111 of the MFP 100 controls the communication unit 126 to transmit to the file server 400 a request for closing the folder corresponding to the file access handler. Then, the processing exits the flowchart.

The above-described processing makes it possible to update the third page of the existing file (Sample3.pptx) stored in the file server 400 connectable with the MFP 100 via SMB communication.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-045085, filed Mar. 22, 2022, which is hereby incorporated by reference herein in its entirety.

What is claimed is:

1. An image processing apparatus comprising:
a scanner that scans a first image of a document to generate image data based on the first image; and
a controller that receives, from a user, a selection of a file including page data; and
a communicator that receives the selected file from a cloud server, the selected file being stored in the cloud server,
wherein the controller receives, from the user, a selection of a page of the page data included in the received file,
wherein the controller displays, on a display, the first image and a second image of the selected page included in the selected file, the first image being overlayed on the second image, and then the controller receives, in a state that the first image and the second image are displayed on the display and that the first image is overlayed on the second image, a designation of a position where the first image is to be inserted, the designation being received from the user, wherein the controller performs processing for inserting the first image to the designated position of the page data of the selected page included in the selected file, and wherein the communicator transmits the page data to which the first image is inserted and a request for writing the page data to the file stored in the cloud server to the cloud server.

2. The image processing apparatus according to claim 1, wherein the file is a file used by a presentation tool.

3. The image processing apparatus according to claim 1, wherein the file is a file used by a spreadsheet tool.

4. The image processing apparatus according to claim 1, wherein the controller receives an execution instruction for scanning the first image of the document in a state that the second image is displayed on the display.

5. The image processing apparatus according to claim 1, wherein the file is a file stored before the document is scanned.

6. The image processing apparatus according to claim 1, wherein the scanner scans a plurality of document sheets to generate a plurality of image data pieces based on a single execution instruction, and wherein the controller receives a selection of the page to be subjected to image data insertion in the file for each of the plurality of generated image data pieces.

7. An image processing method comprising:

scanning a first image of a document to generate image data based on the first image;

receiving, from a user, a selection of a file including page data;

receiving the selected file from a cloud server, the selected file being stored in the cloud server;

receiving, from the user, a selection of a page of the page data included in the received file;

displaying, on a display, the first image and a second image of the selected page included in the selected file, the first image being overlayed on the second image, and then receiving, in a state that the first image and the second image are displayed on the display and that the first image is overlayed on the second image, a designation of a position where the first image is to be inserted, the designation being received from the user;

performing processing for inserting the first image to the designated position of the page data of the selected page included in the selected file; and transmitting the page data to which the first image is inserted and a request for writing the page data to the file stored in the cloud server to the cloud server.

8. A non-transitory computer-readable storage medium storing a program for causing a computer to execute an image processing method comprising:

scanning a first image of a document to generate image data based on the first image;

receiving, from a user, a selection of a file including page data;

receiving the selected file from a cloud server, the selected file being stored in the cloud server;

receiving, from the user, a selection of a page of the page data included in the received file;

displaying, on a display, the first image and a second image of the selected page included in the selected file, the first image being overlayed on the second image, and then receiving, in a state that the first image and the second image are displayed on the display and that the first image is overlayed on the second image, a designation of a position where the first image is to be inserted, the designation being received from the user;

performing processing for inserting the first image to the designated position of the page data of the selected page included in the selected file; and transmitting the page data to which the first image is inserted and a request for writing the page data to the file stored in the cloud server to the cloud server.

* * * * *